June 21, 1955 — G. R. DUDDING — 2,711,060

SICKLE KNIFE SHARPENER ATTACHMENT FOR TRACTOR

Filed Feb. 10, 1954

INVENTOR
*Gordon R. Dudding*

BY *Beale and Jones*

ATTORNEYS

United States Patent Office 2,711,060
Patented June 21, 1955

2,711,060

SICKLE KNIFE SHARPENER ATTACHMENT FOR TRACTOR

Gordon R. Dudding, Culloden, W. Va.

Application February 10, 1954, Serial No. 409,300

4 Claims. (Cl. 51—258)

My invention relates to a sickle bar sharpening attachment for a tractor.

It is an object of my invention to provide an easily retractable elongated platform for attachment to a tractor wherein the platform has mounted thereon a pair of bearings supporting a shaft having a pulley on one end to receive a belt from the power take off of the tractor and a grinding wheel on the other end for grinding sickle knives.

Another object of my invention is to provide a movable mounting of the bearings above described so that the belt may be tightened.

A still further object of my invention is to provide in the above described platform an elongated slot adapted to slide about a stud securing means affixed to the tractor so that the platform may be moved to either a retracted or operating position.

Another object of my invention is to provide a guide block on the tractor over which the platform mounting the grinding wheel shaft slides and is held in cooperation with the slot and stud in a firm position either in a retracted or an extended position.

A still further object of my invention is to provide an intermediate elongated mounting plate for the bearings supporting the grinding wheel shaft wherein this plate has a pair of spaced transverse slots therein which are received over bolts with thumb screw take up nuts that secure the intermediate plate to the elongated platform in an adjustable manner.

For a more complete understanding of the nature and scope of my invention reference may be had to the description below and the figures of the drawing in which.

Figure 1:
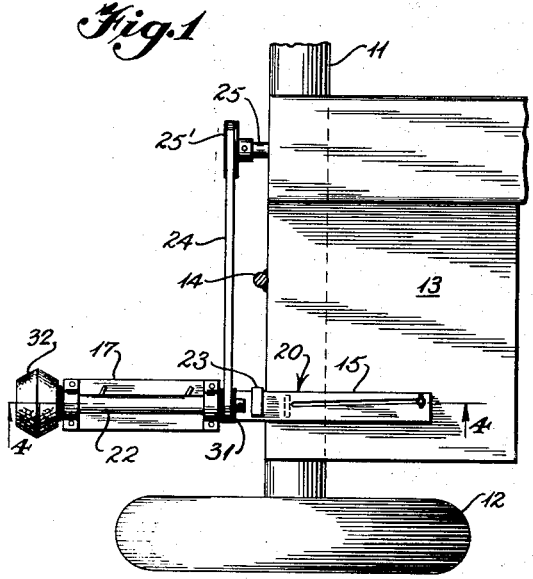
Fig. 1 is a fragmentary plan view of the rear end of a tractor showing my sickle knife sharpener attachment in an extended position with power take off belt in position ready for use.
Figure 2:
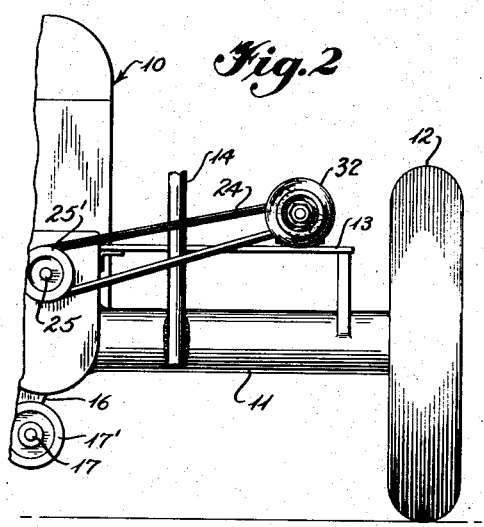
Fig. 2 is a left hand side view of Fig. 1.
Figure 3:
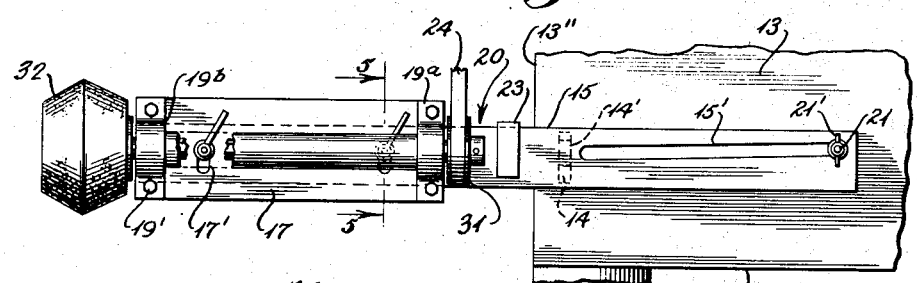
Fig. 3 is an enlarged plan view showing a fragmentary portion of the tractor platform with my sharpener attachment in extended position as in Fig. 1.

A tractor on which my attachment is shown mounted is generally indicated at 10, having a rear axle housing 11, rear wheels 12, only one of which is shown, a foot platform 13 for the operator, a seat post 14, and a rear power take off shaft 25 with its V-belt pulley 25' attached. A fitting 16 attached to the bottom of the tractor below power take off shaft 25 supports the side cutter mechanism not shown. However, attachment 16 has mounted therein a drive shaft 17 and an attached drive pulley 17' positioned in line with and vertically below the power take off pulley 25'.

Figure 5:
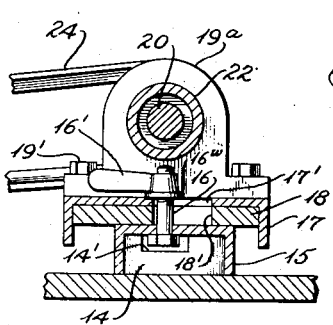
Fig. 5 is a sectional view along line 5—5 of Fig. 4.

My sickle knife sharpener attachment for the tractor is generally indicated at 20. I attached as by welding a vertical stud 21 to the platform in a position towards its right hand edge 13' and spaced inward from the rear edge 13" about 14 inches. Stud 21 is threaded at its upper end and receives a wing nut 21'. Also in general fore and aft alignment with stud 21 but to the rear thereof adjacent the rear edge 13' of platform 13 I affix, as by welding, a guide block 14 having a cut out portion 14' in its upper portion as shown best in Fig. 5. Guide block 14 is a rectangular block of steel and is positioned to extend transversely to the fore and aft directions of the platform 13.

Figure 4:
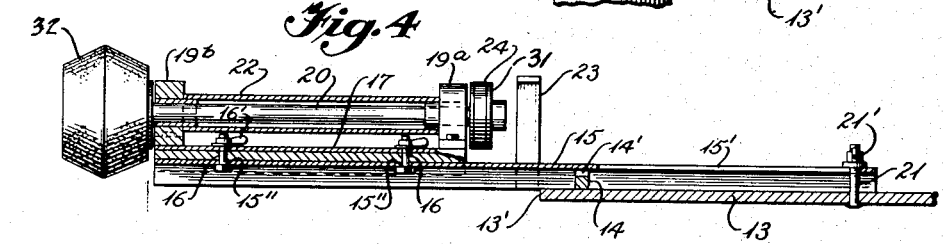
Fig. 4 is an enlarged sectional view along line 4—4 of Fig. 1.

An elongated U-shaped channel serves as the elongated platform 15 and this is retractably mounted on platform 13 over the upstanding stud 21 and guide block 14 as will presently be described. Platform 15 has cut in its upper portion and toward its front end a generally fore and aft extending slot 15' which is received by the stud 21 projecting upwardly therethrough. At the other or rear end of platform 15 there are formed two apertures 15", which are in spaced relation to each other and in fore and aft alignment with the cut out portion 14' in guide block 14. Secured in each of these apertures 15", as by welding, is a vertically extending bolt 16, best shown in Fig. 5, having a wing nut 16' threadedly received on its upper vertically extending end. These vertically extending bolts 16 projecting up beyond the top surface of channel shaped platform 15 receive an elongated bearing bed plate 17 which is also in the form of a channel in cross section. Bed plate 17 has transverse slots 17' formed therein which receive the vertically extending bolts 16. If desired a spacer member 18 may be placed between the platform 15 and the bed plate 17. In such a case the spacer member 18 has slots 18' formed therein in alignment with slots 17' in bed plate 17. This bed plate may be used if the pulley on the countershaft to be described is of such size that it needs more clearance from the top of platform 15. It will be noted in Figures 4 and 5 that the wing nuts 16' are formed with a washer element 16w which rides against the top face of bed plate 17 to hold the bed plate in adjusted position. Bed plate 17 extends from the rear end of platform 15 for a distance about one-third the length of platform 15.

Mounted on bed plate 17 at either end are transversely extending pillow block bearings 19a and 19b as by bolts 19'. Bearings 19a and 19b carry a countershaft 20 which has a drive pulley 31 secured to the leading end that projects just forward of bearing 19a while the rear projecting end of shaft 20 has secured thereto grinding wheel 32 for sickle knives. The grinding wheel 32 is of double frustrum of a cone shape which provides surfaces that lead to the ease of sharpening the triangular-like shaped sickle bar knives. Mounted over shaft 20 and in spaced relation thereto spanning the space between bearings 19a and 19b is a guard tube 22 which may be of light weight plastic material. This guard tube 22 is held in a non-rotatable position between bearings 19a and 19b and prevents contact with the shaft 20 which rotates at relatively high speed.

Another guard 23 is affixed to the top of platform 15 adjacent to the end of shaft 20 and pulley 31. This guard is a U-shaped piece of strap iron which has its legs welded to the top surface of platform 15. The grinding wheel 32 is driven by a V-belt 24 which connects the tractor power take off pulley 25', with pulley 31 on the end of countershaft 20 carrying the grinding wheel 32. The slots 17' in bed plate 17 permit movement of the bed plate 17 when thumb screws 16' are loosened so that the belt 24 may be tightened. Conversely, when the sharpening job has been completed, bed plate 17 may be slid to loosen belt 24 so that the belt may be removed. After belt 24 has been removed, the platform 15 is slid to its retracted position by loosening thumb nut 21' and pushing the platform 15 forward over the guide block 14 while slot 15' permits the platform to slide past the anchor post or bolt 21. When the platform 15 is fully retracted, thumb nut 21' is tightened and the platform is held retracted until additional use is to be made thereof.

I have provided a very useful attachment for a tractor whereby sickle knives may be readily sharpened without having to take them to a shop. The tractor to which the mowing machine attachment is mounted serves as the source of power and mounting for the sharpening attachment. The attachment is rugged in construction, provides an easily accessible grinding wheel when extended for grinding yet may be retracted and when not in use, to a position out of the way of the normal use of the tractor.

I claim as my invention:

1. In a sickle grinder for attachment to a tractor having a power takeoff, the combination of an elongated platform having an elongated slot in one end thereof and extending in the elongated direction of the platform, a vertical stud mounted on the tractor and adapted to be contained in said slot in the platform, nut means for said stud adapted to hold said platform in adjusted position, a guide block for mounting on said tractor and cooperating with said platform to prevent transverse movement thereof, an elongated bed plate mounted over the other end of said platform, said bed plate having transverse slots therein, bolt means attached to said platform and extending through said transverse slots in the bed plate securing said bed plate to said platform, in an adjusted position, a pair of spaced apart bearings carried by said bed plate, a grinding wheel shaft mounted in said bearings, a grinding wheel on the outer end of said shaft, a drive pulley on the inner end of said shaft, and a driving connection between the power take off of said tractor and said pulley, whereby the attachment may be extended for use of the grinding wheel and retracted when not in use and said transverse slots in the bed plate and the securing bolt means permit adjustment of the bed plate relative to the elongated platform for tightening and loosening of the drive connection means.

2. In a sickle grinder for attachment to a tractor having a power takeoff, the combination of an elongated platform having an elongated slot in one end thereof and extending in the elongated direction of the platform, said platform being of channel shape in cross section having depending legs and a cross web joining the same and being mounted with the legs extending downward, said elongated slot being positioned in the web of said platform, a vertical stud mounted on the tractor and adapted to be contained in said slot in the platform, nut means for said stud adapted to hold said platform in adjusted position on the tractor, a guide block for mounting on said tractor in general alignment with said vertical stud and adapted to project into the interior space of said platform between its legs and web, and to prevent transverse movement thereof, an elongated bed plate mounted over the other end of said platform and having transverse slots therein, bolt means attached to said platform and extending through said transverse slots in the bed plate securing said bed plate to said platform in an adjusted position transversewise of said platform, a pair of spaced apart bearings carried by said bed plate, a grinding wheel shaft mounted in said bearings and having its ends extending beyond the end of the bed plate, a stationary guard sleeve disposed over said shaft and between said bearings, a grinding wheel on the outer projecting end of said shaft, a driving pulley on the inner projecting end of said shaft, and a drive connection between the power take off of said tractor and said pulley, whereby the attachment may be extended for use of the grinding wheel and retracted when not in use and said transverse slots in the bed plate and the securing bolt means permit adjustment of the bed plate relative to the elongated platform for tightening and loosening of the drive connection means.

3. A sickle grinder for attachment to a tractor according to claim 2 including a spacer block positioned intermediate said platform and said bed plate.

4. A sickle grinder for attachment to a tractor according to claim 2 wherein said guide block attached to said platform has a slot formed in its upper surface intermediate its ends, said bolt means on the platform for securing the bed plate comprise a pair of bolts projecting up through apertures formed in the web of the platform with the heads of said bolts projecting downward beyond the bottom surface of the web and in alignment with the slot in said guide block and thumb screw nuts threadedly received on the upper ends of said bolts and adapted to slot against the upper surface of said bed plate adjacent said slots therein.

References Cited in the file of this patent

UNITED STATES PATENTS

| 2,420,645 | Beeler | May 20, 1947 |
| 2,547,442 | Crafton et al. | Apr. 3, 1951 |

FOREIGN PATENTS

| 132,097 | Australia | Apr. 6, 1949 |